(12) United States Patent  
Xu

(10) Patent No.: US 12,481,451 B2
(45) Date of Patent: Nov. 25, 2025

(54) DATA READ/WRITE METHOD AND HYBRID MEMORY

(71) Applicant: HONOR DEVICE CO., LTD., Shenzhen (CN)

(72) Inventor: Zhongjie Xu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 31 days.

(21) Appl. No.: 18/015,889

(22) PCT Filed: Jan. 17, 2022

(86) PCT No.: PCT/CN2022/072416
§ 371 (c)(1),
(2) Date: Jan. 12, 2023

(87) PCT Pub. No.: WO2022/170923
PCT Pub. Date: Aug. 18, 2022

(65) Prior Publication Data
US 2023/0280932 A1 Sep. 7, 2023

(30) Foreign Application Priority Data

Feb. 9, 2021 (CN) .......................... 202110182302.5
Jun. 11, 2021 (CN) .......................... 202110654001.8

(51) Int. Cl.
*G06F 12/10* (2016.01)
*G06F 3/06* (2006.01)

(52) U.S. Cl.
CPC .......... *G06F 3/0655* (2013.01); *G06F 3/0604* (2013.01); *G06F 3/068* (2013.01);
(Continued)

(58) Field of Classification Search
CPC ...... G06F 3/0655; G06F 3/0604; G06F 3/068; G06F 12/10; G06F 2212/205; Y02D 10/00
See application file for complete search history.

(56) References Cited

U.S. PATENT DOCUMENTS 7,747,886 B1* 6/2010 Bridgwater ........... G06F 1/3203
713/323
2008/0046660 A1* 2/2008 Takai ............... G11B 20/10527
711/E12.019
(Continued)

FOREIGN PATENT DOCUMENTS

CN 101561950 A 10/2009
CN 102314321 A 1/2012
(Continued)

*Primary Examiner* — Tim T Vo
*Assistant Examiner* — Janice M. Girouard
(74) *Attorney, Agent, or Firm* — WOMBLE BOND DICKINSON (US) LLP

(57) ABSTRACT

A data read/write method and a hybrid memory are disclosed, and relate to the field of terminals, so as to improve read/write performance and reduce power consumption. The hybrid memory includes a storage controller, a volatile storage medium, and a non-volatile storage medium. The storage controller may receive a read/write instruction from a processor, where the read/write instruction carries a first address (the first address may be a physical address or a logical address); and if the first address corresponds to a storage space of the volatile storage medium, the storage controller may perform data read/write processing in the storage space of the volatile storage medium; or if the first address corresponds to a storage space of the non-volatile storage medium, the storage controller may perform data read/write processing in the storage space of the non-volatile storage medium.

20 Claims, 7 Drawing Sheets

(52) U.S. Cl.
CPC ........ *G06F 12/10* (2013.01); *G06F 2212/205* (2013.01); *Y02D 10/00* (2018.01)

(56) References Cited

U.S. PATENT DOCUMENTS

| | | | | |
|---|---|---|---|---|
| 2012/0102499 | A1* | 4/2012 | Flemming | G06F 1/3293 718/104 |
| 2012/0324481 | A1 | 12/2012 | Xia et al. | |
| 2013/0132648 | A1 | 5/2013 | Choi et al. | |
| 2017/0046169 | A1 | 2/2017 | Chen et al. | |
| 2017/0068304 | A1 | 3/2017 | Lee et al. | |
| 2017/0228160 | A1 | 8/2017 | Vembu et al. | |
| 2018/0157585 | A1* | 6/2018 | Barrus | G06F 12/023 |
| 2019/0004895 | A1 | 1/2019 | Lee | |
| 2019/0155515 | A1* | 5/2019 | Farey | G06F 3/0659 |
| 2019/0188012 | A1 | 6/2019 | Chen et al. | |
| 2019/0196989 | A1 | 6/2019 | Lu et al. | |
| 2019/0317894 | A1 | 10/2019 | Frolikov | |
| 2019/0385383 | A1* | 12/2019 | Sato | G07C 5/0866 |
| 2020/0081763 | A1 | 3/2020 | Mittal et al. | |
| 2020/0167297 | A1 | 5/2020 | Niu et al. | |
| 2021/0304836 | A1* | 9/2021 | Lee | G11C 7/1057 |
| 2021/0391020 | A1* | 12/2021 | Choi | G11C 16/10 |
| 2022/0129383 | A1* | 4/2022 | Kim | G06F 12/0806 |
| 2022/0358460 | A1* | 11/2022 | Oishi | G06Q 10/08 |

FOREIGN PATENT DOCUMENTS

| | | |
|---|---|---|
| CN | 103999038 A | 8/2014 |
| CN | 104360825 A | 2/2015 |
| CN | 105786726 A | 7/2016 |
| CN | 106775476 A | 5/2017 |
| CN | 106775820 A | 5/2017 |
| CN | 108628645 A | 10/2018 |
| CN | 106547490 B | 2/2019 |
| CN | 109947496 A | 6/2019 |
| CN | 109976821 A | 7/2019 |
| CN | 109992522 A | 7/2019 |
| CN | 110442380 A | 11/2019 |
| WO | 2018041074 A1 | 3/2018 |

* cited by examiner

DATA READ/WRITE METHOD AND HYBRID MEMORY

CROSS-REFERENCE TO RELATED APPLICATIONS

This application is a National Stage of International Application No. PCT/CN2022/072416, filed Jan. 17, 2022, which claims priority to Chinese Patent Application No. 202110182302.5, filed on Feb. 9, 2021, and Chinese Patent Application No. 202110654001.8, filed on Jun. 11, 2021. All of the aforementioned applications are hereby incorporated by reference in their entireties.

TECHNICAL FIELD

This application relates to the field of terminals, and in particular, to a data read/write method and a hybrid memory.

BACKGROUND

Currently, there are two types of storage media for electronic devices (such as smart phones or tablet computers): volatile memory (VM) and non-volatile memory (NVM). The volatile memory may include a random access memory (RAM). The RAM may be, for example, a dual data rate (DDR) memory. Content stored in the volatile memory is lost in a case of sudden loss of system power. The non-volatile memory may include, for example, a hard drive disk (HDD) and a solid state disk (SSD). Data of the non-volatile memory is not lost in a case that a computer is powered off or the computer is suddenly or unexpectedly shutdown.

The volatile memory and non-volatile memory have the following problems: the volatile memory has relatively high power consumption during data reading/writing, and the non-volatile memory may have relatively long delay and waiting time during data reading/writing, featuring low read/write performance.

SUMMARY

Embodiments of this application provide a data read/write method and a hybrid memory, so as to improve read/write performance and reduce power consumption.

According to a first aspect, an embodiment of this application provides a hybrid memory. The hybrid memory includes a storage controller, a volatile storage medium, and a non-volatile storage medium, and a physical address segment of the volatile storage medium is different from a physical address segment of the non-volatile storage medium; the storage controller is configured to receive a read/write instruction from a processor, where the read/write instruction carries a first address; and if the first address corresponds to a storage space of the volatile storage medium, the storage controller is configured to write data into the storage space of the volatile storage medium or read data from the storage space of the volatile storage medium; or if the first address corresponds to a storage space of the non-volatile storage medium, the storage controller is configured to write data into the storage space of the non-volatile storage medium or read data from the storage space of the non-volatile storage medium.

The volatile storage medium group in the hybrid memory provided in this embodiment of this application is capable of supporting high-speed data processing to implement high read/write performance. The non-volatile storage medium group in the hybrid memory has higher performance and lower power consumption at a relatively low frequency. Therefore, use of the hybrid memory can improve the read/write performance of electronic devices and reduce power consumption, so as to meet basic demands for low power consumption and high performance of electronic devices on the market. In addition, the hybrid memory features simple hardware implementation, simple internal design, and low costs.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor. The hybrid memory features simple hardware implementation, simple internal design, easier implementation, and lower costs.

In a possible implementation, the volatile storage medium includes at least one of a double data rate DDR memory, a DDR2, a DDR3, a DDR4, a high bandwidth memory (HBM), a dynamic random access memory (DRAM), or a 3D super DRAM (Super-DRAM); and the non-volatile storage medium includes at least one of a single level cell storage flash memory/single level cell flash memory (SLC)-NAND, a magnetic random access memory (MRAM), a resistance random access memory (RRAM), a phase change random access memory (PCRAM), a 3D-Xpoint storage medium, or a 3D-SLC NAND flash memory. A type of the volatile storage medium or the non-volatile storage medium is not limited in this embodiment of this application.

In a possible implementation, the hybrid memory is installed in an electronic device as a memory. Program data in a running process can be stored in the hybrid memory. In this way, when the electronic device uses the hybrid memory as a memory, the volatile storage medium group in the hybrid memory is capable of supporting high-speed data processing to implement high read/write performance. The non-volatile storage medium group in the hybrid memory has higher performance and lower power consumption at a relatively low frequency. Therefore, use of the hybrid memory can improve the read/write performance of electronic devices and reduce power consumption, so as to meet basic demands for low power consumption and high performance of electronic devices on the market.

In a possible implementation, the hybrid memory is powered off when the electronic device is screen-off. In contrast, a conventional memory (for example, a RAM serving as a memory) cannot be completely powered off in a screen-off state; otherwise, data in the memory is lost. Data in the non-volatile storage medium group of the hybrid memory provided in this embodiment of this application is not lost, and useful data can be stored in the non-volatile storage medium group. In this way, power can be completely interrupted when the electronic device is in the screen-off state, thereby greatly reducing power consumption. In addition, when the conventional memory is powered off, data in the memory is lost; and upon power-on next time, a to-be-executed program needs to be imported into the memory for processing before the system can be started. However, when the hybrid memory is powered off, the data in the non-volatile storage medium group of the hybrid memory is not lost, and a to-be-executed program can be stored in the non-volatile storage medium group, so that the to-be-executed program can be resumed quickly upon power-on next time, thereby better reducing standby power consumption and improving startup performance.

In a possible implementation, the non-volatile storage medium is configured to store data of a preset type, and the data of the preset type includes at least one of artificial intelligence AI data, patterns, and training results, for instant training. In contrast, in the prior art, it is necessary to recalculate data of a preset type after power-on, leading to power consumption, or to read data of a preset type from a low-speed storage, leading to low efficiency. However, in this embodiment of this application, a SoC can directly read the data of the preset type from the hybrid memory serving as a memory, requiring much less time than recalculation and also much less time than reading from a low-speed storage.

In a possible implementation, the first address is a physical address or a logical address; and if the first address is a logical address, the storage controller is further configured to translate the logical address to a physical address. If the first address is a physical address, the storage controller may directly perform addressing to the volatile storage medium or the non-volatile storage medium based on the physical address and determine a storage space corresponding to the physical address. If the first address is a logical address, the storage controller is further configured to translate the logical address into a physical address, perform addressing to the volatile storage medium or the non-volatile storage medium based on the physical address, and determine a storage space corresponding to the physical address.

According to a second aspect, an embodiment of this application provides a hybrid memory, where the hybrid memory includes a storage controller, a volatile storage medium, and a non-volatile storage medium, and a physical address segment of the volatile storage medium is the same as a physical address segment of the non-volatile storage medium; the storage controller receives a read/write instruction from a processor, where the read/write instruction carries a first address; and if a main frequency of the processor is greater than a maximum read/write frequency of the non-volatile storage medium, the storage controller is configured to write data into the storage space of the volatile storage medium or read data from the storage space of the volatile storage medium; or if a main frequency of the processor is less than or equal to a maximum read/write frequency of the non-volatile storage medium, the storage controller is configured to write data into the storage space of the non-volatile storage medium or read data from the storage space of the non-volatile storage medium.

In this way, when the processor is at a high main frequency (that is, a clock frequency of the processor is greater than the maximum read/write frequency of the non-volatile storage medium), data is written into the volatile storage medium to meet fast action requirements because the maximum read/write frequency of the non-volatile storage medium is less than the main frequency (that is, a data processing speed of the non-volatile storage medium is less than a data processing speed of the processor). When the main frequency of the processor is reduced, the maximum read/write frequency of the non-volatile storage medium is greater than or equal to the main frequency, that is, the data processing speed of the non-volatile storage medium can reach the data processing speed of the processor, and then the data can be written into the non-volatile storage medium, implementing lower power consumption. In this case, the volatile storage medium may enter an extremely low power-consuming state to achieve effects of reducing power consumption.

In a possible implementation, if the main frequency of the processor is greater than the maximum read/write frequency of the non-volatile storage medium, the storage controller is further configured to write, into the storage space of the non-volatile storage medium, data that has been written into the storage space of the volatile storage medium; or if the main frequency of the processor is less than or equal to the maximum read/write frequency of the non-volatile storage medium, the storage controller is further configured to write, into the storage space of the volatile storage medium, data that has been written into the storage space of the non-volatile storage medium.

To be specific, when the processor is at a high frequency, the data is first written to the volatile storage medium, and then the storage controller automatically transfers the data to the non-volatile storage medium having a lower speed; and when the system runs at a low speed range matching that of the non-volatile storage medium, the data is first written to the non-volatile storage medium, and then the storage controller automatically transfers the data to the volatile storage medium. The foregoing process may be completed by the storage controller of the hybrid memory, without requiring processing by the processor, thereby reducing load of the processor side and improving processing performance of the processor.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor.

In a possible implementation, the volatile storage medium includes at least one of a double data rate DDR memory, a DDR2, a DDR3, a DDR4, a high bandwidth memory HBM, a dynamic random access memory DRAM, or a 3D super DRAM; and the non-volatile storage medium includes at least one of a single level cell storage flash memory SLC-NAND, a magnetic random access memory MRAM, a resistance random access memory RRAM, a phase change random access memory PCRAM, a 3D-Xpoint storage medium, or a 3D-SLC NAND flash memory.

In a possible implementation, the hybrid memory is installed in an electronic device as a memory.

In a possible implementation, the hybrid memory is powered off when the electronic device is screen-off.

In a possible implementation, the non-volatile storage medium is configured to store data of a preset type, and the data of the preset type includes at least one of artificial intelligence AI data, patterns, and training results, for instant training.

In a possible implementation, the first address is a physical address or a logical address; and if the first address is a logical address, the storage controller is further configured to translate the logical address to a physical address.

According to a third aspect, an embodiment of this application provides a hybrid memory, where the hybrid memory includes a storage controller, a volatile storage medium, and a non-volatile storage medium, and a physical address segment of the volatile storage medium is partially the same as a physical address segment of the non-volatile storage medium. The storage controller receives a read/write instruction from a processor, where the read/write instruction carries a first address. In a case that the first address corresponds to both a storage space of the non-volatile storage medium and a storage space of the volatile storage medium, if a main frequency of the processor is greater than a maximum read/write frequency of the non-volatile storage medium read/write frequency, the storage controller is configured to write data into the storage space of the volatile storage medium or read data from the storage space of the volatile storage medium; or if a main frequency of the processor is less than or equal to a maximum read/write frequency of the non-volatile storage medium, the storage controller is configured to write data into the storage space of the non-volatile storage medium or read data from the storage space of the non-volatile storage medium. In a case that the first address corresponds to a storage space of the non-volatile storage medium or a storage space of the volatile storage medium, if the first address corresponds to the storage space of the volatile storage medium, the storage controller is configured to write data into the storage space of the volatile storage medium or read data from the storage space of the volatile storage medium; or if the first address corresponds to the storage space of the non-volatile storage medium, the storage controller is configured to write data into the storage space of the non-volatile storage medium or read data from the storage space of the non-volatile storage medium.

In this embodiment of this application, after the hybrid memory receives the first address, in the case that the first address corresponds to both the storage space of the non-volatile storage medium and the storage space of the volatile storage medium, when the processor is at a high main frequency (that is, a clock frequency of the processor is greater than the maximum read/write frequency of the non-volatile storage medium), the data is written into the volatile storage medium to meet fast action requirements because the maximum read/write frequency of the non-volatile storage medium is less than the main frequency (that is, the data processing speed of the non-volatile storage medium is less than the data processing speed of the processor). When the main frequency of the processor is reduced, the maximum read/write frequency of the non-volatile storage medium is greater than or equal to the main frequency, that is, the data processing speed of the non-volatile storage medium can reach the data processing speed of the processor, and then the data can be written into the non-volatile storage medium, implementing lower power consumption. In this case, the volatile storage medium may enter an extremely low power-consuming state to achieve effects of reducing power consumption.

In the case that the first address corresponds to the storage space of the non-volatile storage medium or that of the volatile storage medium, the data can be directly read from or written into the storage space, indicated by the first address, of the non-volatile storage medium or the volatile storage medium. The volatile storage medium group is capable of supporting high-speed data processing to implement high read/write performance. The non-volatile storage medium group in the hybrid memory has higher performance and lower power consumption at a relatively low frequency. Therefore, use of the hybrid memory can improve the read/write performance of electronic devices and reduce power consumption, so as to meet basic demands for low power consumption and high performance of electronic devices on the market.

In a possible implementation, if the main frequency of the processor is greater than the maximum read/write frequency of the non-volatile storage medium, the storage controller is further configured to write, into the storage space of the non-volatile storage medium, data that has been written into the storage space of the volatile storage medium; or if the main frequency of the processor is less than or equal to the maximum read/write frequency of the non-volatile storage medium, the storage controller is further configured to write, into the storage space of the volatile storage medium, data that has been written into the storage space of the non-volatile storage medium.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor.

In a possible implementation, the volatile storage medium includes at least one of a double data rate DDR memory, a DDR2, a DDR3, a DDR4, a high bandwidth memory HBM, a dynamic random access memory DRAM, or a 3D super DRAM; and the non-volatile storage medium includes at least one of a single level cell storage flash memory SLC-NAND, a magnetic random access memory MRAM, a resistance random access memory RRAM, a phase change random access memory PCRAM, a 3D-Xpoint storage medium, or a 3D-SLC NAND flash memory.

In a possible implementation, the hybrid memory is installed in an electronic device as a memory.

In a possible implementation, the hybrid memory is powered off when the electronic device is screen-off.

In a possible implementation, the non-volatile storage medium is configured to store data of a preset type, and the data of the preset type includes at least one of artificial intelligence AI data, patterns, and training results, for instant training.

In a possible implementation, the first address is a physical address or a logical address; and if the first address is a logical address, the storage controller is further configured to translate the logical address to a physical address.

According to a fourth aspect, an embodiment of this application provides a data read/write method applied to a hybrid memory, where the hybrid memory includes a storage controller, a volatile storage medium, and a non-volatile storage medium, a physical address segment of the volatile storage medium is different from a physical address segment of the non-volatile storage medium, and the method includes: receiving, by the storage controller, a read/write instruction from a processor, where the read/write instruction carries a first address; and if the first address corresponds to the storage space of the volatile storage medium, writing, by the storage controller, data into the storage space of the volatile storage medium or reading data from the storage space of the volatile storage medium; or if the first address corresponds to the storage space of the non-volatile storage medium, writing, by the storage controller, data into the storage space of the non-volatile storage medium or reading data from the storage space of the non-volatile storage medium.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor.

In a possible implementation, the volatile storage medium includes at least one of a double data rate DDR memory, a DDR2, a DDR3, a DDR4, a high bandwidth memory HBM, a dynamic random access memory DRAM, or a 3D super DRAM; and the non-volatile storage medium includes at least one of a single level cell storage flash memory SLC-NAND, a magnetic random access memory MRAM, a resistance random access memory RRAM, a phase change random access memory PCRAM, a 3D-Xpoint storage medium, or a 3D-SLC NAND flash memory.

In a possible implementation, the hybrid memory is installed in an electronic device as a memory.

In a possible implementation, the hybrid memory is powered off when the electronic device is screen-off.

In a possible implementation, the non-volatile storage medium is configured to store data of a preset type, and the data of the preset type includes at least one of artificial intelligence AI data, patterns, and training results, for instant training.

In a possible implementation, the first address is a physical address or a logical address; and if the first address is a logical address, the storage controller is further configured to translate the logical address to a physical address.

According to a fifth aspect, an embodiment of this application provides a data read/write method applied to a hybrid memory, where the hybrid memory includes a storage controller, a volatile storage medium, and a non-volatile storage medium, a physical address segment of the volatile storage medium is the same as a physical address segment of the non-volatile storage medium, and the method includes: receiving, by the storage controller, a read/write instruction from a processor, where the read/write instruction carries a first address; and if a main frequency of the processor is greater than a maximum read/write frequency of the non-volatile storage medium read/write frequency, writing, by the storage controller, data into the storage space of the volatile storage medium or reading data from the storage space of the volatile storage medium; or if a main frequency of the processor is less than or equal to a maximum read/write frequency of the non-volatile storage medium, writing, by the storage controller, data into the storage space of the non-volatile storage medium or reading data from the storage space of the non-volatile storage medium.

In a possible implementation, if the main frequency of the processor is greater than the maximum read/write frequency of the non-volatile storage medium, the storage controller is further configured to write, into the storage space of the non-volatile storage medium, data that has been written into the storage space of the volatile storage medium; or if the main frequency of the processor is less than or equal to the maximum read/write frequency of the non-volatile storage medium, the storage controller is further configured to write, into the storage space of the volatile storage medium, data that has been written into the storage space of the non-volatile storage medium.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor.

In a possible implementation, the volatile storage medium includes at least one of a double data rate DDR memory, a DDR2, a DDR3, a DDR4, a high bandwidth memory HBM, a dynamic random access memory DRAM, or a 3D super DRAM; and the non-volatile storage medium includes at least one of a single level cell storage flash memory SLC-NAND, a magnetic random access memory MRAM, a resistance random access memory RRAM, a phase change random access memory PCRAM, a 3D-Xpoint storage medium, or a 3D-SLC NAND flash memory.

In a possible implementation, the hybrid memory is installed in an electronic device as a memory.

In a possible implementation, the hybrid memory is powered off when the electronic device is screen-off.

In a possible implementation, the non-volatile storage medium is configured to store data of a preset type, and the data of the preset type includes at least one of artificial intelligence AI data, patterns, and training results, for instant training.

In a possible implementation, the first address is a physical address or a logical address; and if the first address is a logical address, the storage controller is further configured to translate the logical address to a physical address.

According to a sixth aspect, an embodiment of this application provides a data read/write method applied to a hybrid memory, where the hybrid memory includes a storage controller, a volatile storage medium, and a non-volatile storage medium, a physical address segment of the volatile storage medium is partially the same as a physical address segment of the non-volatile storage medium, and the method includes: receiving, by the storage controller, a read/write instruction from a processor, where the read/write instruction carries a first address; and in a case that the first address corresponds to both a storage space of the non-volatile storage medium and a storage space of the volatile storage medium, if a main frequency of the processor is greater than a maximum read/write frequency of the non-volatile storage medium read/write frequency, writing, by the storage controller, data into the storage space of the volatile storage medium or reading data from the storage space of the volatile storage medium; or if a main frequency of the processor is less than or equal to a maximum read/write frequency of the non-volatile storage medium, writing, by the storage controller, data into the storage space of the non-volatile storage medium or reading data from the storage space of the non-volatile storage medium; or in a case that the first address corresponds to a storage space of the non-volatile storage medium or a storage space of the volatile storage medium, if the first address corresponds to the storage space of the volatile storage medium, writing, by the storage controller, data into the storage space of the volatile storage medium or reading data from the storage space of the volatile storage medium; or if the first address corresponds to the storage space of the non-volatile storage medium, writing, by the storage controller, data into the storage space of the non-volatile storage medium or reading data from the storage space of the non-volatile storage medium.

In a possible implementation, if the main frequency of the processor is greater than the maximum read/write frequency of the non-volatile storage medium, the storage controller is further configured to write, into the storage space of the non-volatile storage medium, data that has been written into the storage space of the volatile storage medium; or if the main frequency of the processor is less than or equal to the maximum read/write frequency of the non-volatile storage medium, the storage controller is further configured to write, into the storage space of the volatile storage medium, data that has been written into the storage space of the non-volatile storage medium.

In a possible implementation, the hybrid memory further includes at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing 006 externally presents the bus interface, and the bus interface is configured to connect the processor.

In a possible implementation, the volatile storage medium includes at least one of a double data rate DDR memory, a DDR2, a DDR3, a DDR4, a high bandwidth memory HBM, a dynamic random access memory DRAM, or a 3D super DRAM; and the non-volatile storage medium includes at least one of a single level cell storage flash memory SLC-NAND, a magnetic random access memory MRAM, a resistance random access memory RRAM, a phase change random access memory PCRAM, a 3D-Xpoint storage medium, or a 3D-SLC NAND flash memory.

In a possible implementation, the hybrid memory is installed in an electronic device as a memory.

In a possible implementation, the hybrid memory is powered off when the electronic device is screen-off.

In a possible implementation, the non-volatile storage medium is configured to store data of a preset type, and the data of the preset type includes at least one of artificial intelligence AI data, patterns, and training results, for instant training.

In a possible implementation, the first address is a physical address or a logical address; and if the first address is a logical address, the storage controller is further configured to translate the logical address to a physical address.

According to a seventh aspect, an embodiment of this application provides an electronic device including a processor, a hybrid memory, and a bus, where the processor and the hybrid memory are connected through the bus, and the hybrid memory includes a storage controller, a volatile storage medium, and a non-volatile storage medium; and the hybrid memory is configured to store computer program code, the computer program code includes computer instructions, and when the computer instructions are executed by the processor, the processor and the hybrid memory execute any one of the methods provided in the third aspect to the fifth aspect.

According to an eighth aspect, an embodiment of this application provides a computer-readable storage medium including instructions, and when the instruction is executed on a computer, the computer is enabled to execute any one of the methods provided in the third aspect to the fifth aspect.

According to a ninth aspect, an embodiment of this application provides a computer program product including instructions, and when the instruction is executed on a computer, the computer is enabled to execute any one of the methods provided in the third aspect to the fifth aspect.

According to a tenth aspect, an embodiment of this application provides a chip system, where the chip system includes a processor and may further include a memory for implementing any one of the methods provided in the third aspect to the fifth aspect. The chip system may be formed by chips, or may include chips and other discrete components.

DETAILED DESCRIPTION OF EMBODIMENTS

The following describes the technical solutions in the embodiments of this application with reference to the accompanying drawings in the embodiments of this application. In the description of this application, unless otherwise specified, "at least one" means one or more, and "plurality" means two or more than two. In addition, for clear descriptions of the technical solutions of the embodiments of this application, words such as "first" and "second" are used in the embodiments of this application to distinguish between the same or similar items with basically the same functions and roles. Those skilled in the art can understand that the words "first", "second", and the like do not limit the quantity and execution order, and the words "first", "second", and the like do not indicate a definite difference.

At present, a RAM commonly used for fast data access is a double data rate synchronous dynamic random access memory (DDR-SDRAM). Due to electricity leakage of semiconductors, the DDR-SDRAM needs to keep refreshing stored data (that is, to rewrite the data regularly), featuring relatively high power consumption. When the system is suddenly shut down (power outage), its stored content is lost. However, a storage (Storage) supporting permanent data access has a slow data processing speed. The system writing data into the storage usually encounters long delay and waiting. For example, a synchronous write command (SyncWrite) for critical data may cause instantaneous drop of input/output (IO) performance of the storage.

An embodiment of this application provides a hybrid memory (also referred to as a heterogeneous memory or a hybrid heterogeneous memory, which is not limited in this application), which may flexibly serve as a memory device to improve read/write performance of an operating system (OS) and improve performance of a database using the hybrid memory as a storage medium. In addition, the fast-accessed data can be protected from being lost due to power-off, and power-off can be implemented upon completion of writing, thereby reducing power consumption.

Figure 1:
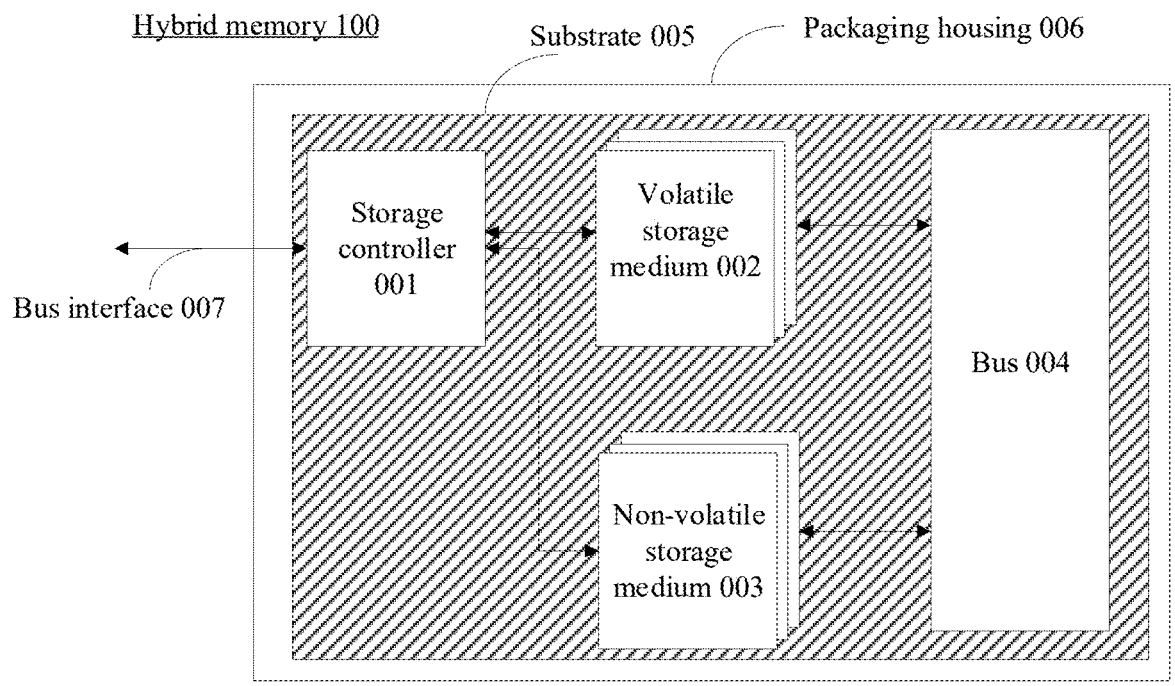
FIG. 1 is a schematic structural diagram of a hybrid memory according to an embodiment of this application.

As shown in FIG. 1, an embodiment of this application provides a hybrid memory 100. The hybrid memory 100 may include a storage controller (controller) 001, a volatile storage medium 002, a nonvolatile storage medium 003, a bus 004, a substrate (substrate) 005, a packaging housing (package) 006, and a bus interface 007. The volatile storage medium 002 and the non-volatile storage medium 003 may be connected to the storage controller 001. The storage controller 001, the volatile storage medium 002, and the nonvolatile storage medium 003 may be integrated on the substrate 005. The volatile storage medium 002 and the nonvolatile storage medium 003 may be connected through the bus 004. The storage controller 001, the volatile storage medium 002, the non-volatile storage medium 003, the bus 004, and the substrate 005 may be packaged inside the packaging housing 006, and the packaging housing 006 may externally present a bus interface 007.

The volatile storage medium may include a DDR memory (DDR for short), a DDR2, a DDR3, a DDR4, a high bandwidth memory HBM, a dynamic random access memory DRAM, a 3D super DRAM (Super-DRAN), or the like. For example, the volatile storage medium may be an HBM with a width of 512 bits and a capacity of 1 GB.

The non-volatile storage medium may be, for example, a single-level cell storage flash memory/single-level cell flash memory SLC-NAND, a magnetic random access memory MRAM, a resistive random access memory RRAM, a phase change random access memory PCRAM, a 3D-Xpoint storage medium, or a 3D-SLC NAND flash memory.

A packaging manner of the hybrid memory 100 may be, for example, a flip package (flip package), a ball grid array (BGA) package, or a wafer level chip scale package (WLCSP).

The bus interface 007 presented externally by the packaging housing 006 may be one interface, for example, may be a DDR4 interface that conforms to the joint electron device engineering council (JEDEC) standards. Alternatively, the bus interface 007 presented externally by the packaging housing 006 may include a plurality of (two or more) interfaces, for example, may include two DDR4 interfaces that conform to the JEDEC standards.

The hybrid memory may be provided in the electronic device, and the hybrid memory may act as a memory of the electronic device, that is, program data may be stored in the hybrid memory in a running process. The electronic device further includes a processor (for example, a system on chip (SoC)). The SoC may act as a master component (HOST), and the hybrid memory may act as a slave component (DEVICE). The SoC may write data into the hybrid memory or read data from the hybrid memory.

The SoC and the hybrid memory may be connected through one or more of a DDR5 interface, an HBM DDR interface, or a PCIeGen5×4 interface. That is, bus-based connection between the SoC and the hybrid memory is rich in choice and combination.

Figure 2:
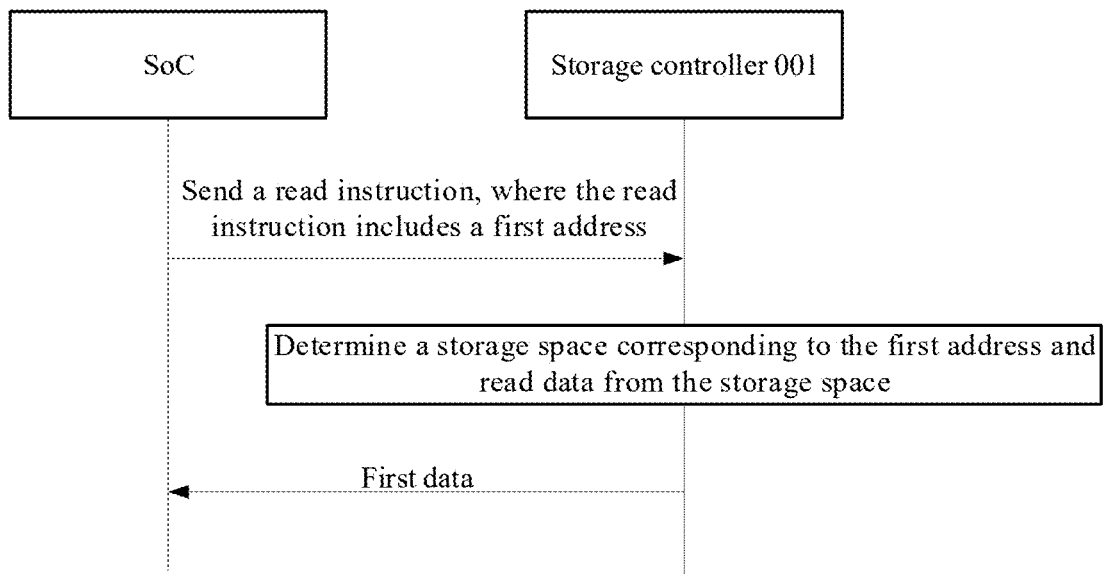
FIG. 2 is a schematic diagram of information exchange according to an embodiment of this application.

As shown in FIG. 2, when the SoC needs to read data from the hybrid memory, the SoC may send a read instruction to the storage controller 001, where the read instruction includes a first address. After receiving the read instruction, the storage controller 001 determines a storage space corresponding to the first address, and reads data from the storage space. The first address may be a first physical address, or may be a first logical address. If the first address is a first physical address, after receiving the read instruction, the storage controller 001 directly performs addressing to the volatile storage medium or the non-volatile storage medium based on the first physical address, determines a storage space corresponding to the first physical address, and reads first data from the storage space corresponding to the first physical address. If the first address is a first logical address, after receiving the read instruction, the storage controller 001 determines a first physical address based on the first logical address, performs addressing to the volatile storage medium or the non-volatile storage medium based on the first physical address, determines a storage space corresponding to the first physical address, and reads first data from the storage space corresponding to the first physical address. Then, the storage controller 001 sends the first data to the SoC.

Figure 3:
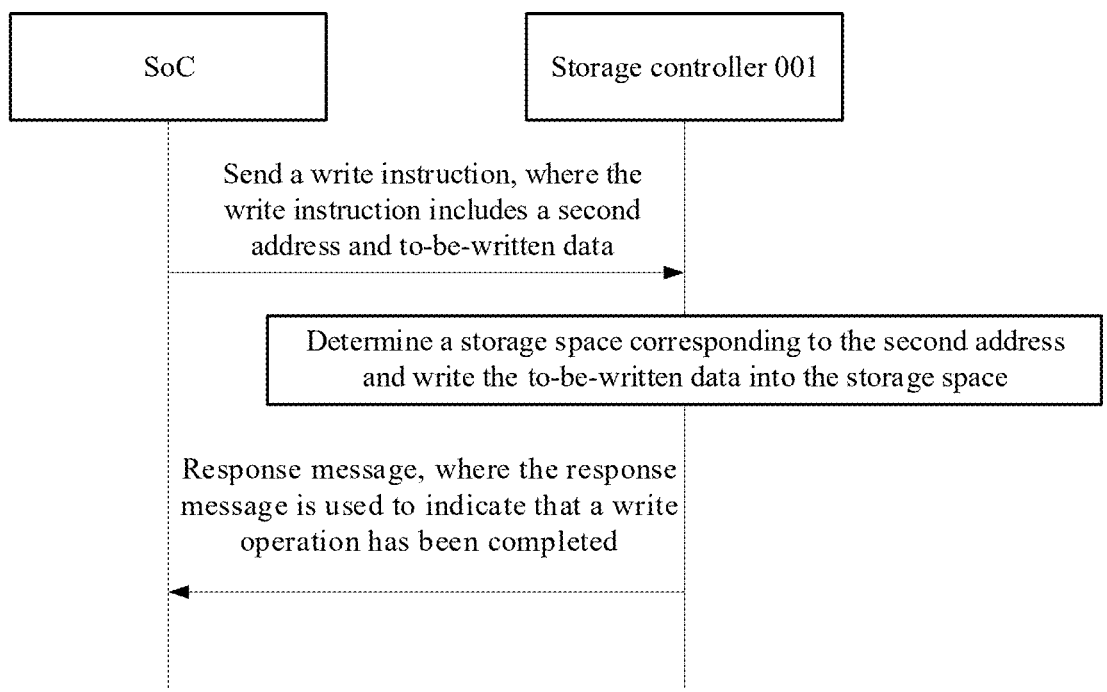
FIG. 3 is a schematic diagram of information exchange according to an embodiment of this application.

As shown in FIG. 3, when the SoC needs to write data into the hybrid memory, the SoC may send a write instruction to the storage controller 001, where the write instruction includes a second address and to-be-written data. After receiving the write instruction, the storage controller 001 determines a storage space corresponding to the second address, and writes the to-be-written data into the storage space. The second address may be a second physical address, or may be a second logical address. If the second address is a second physical address, after receiving the write instruction, the storage controller 001 directly performs addressing to the volatile storage medium or the non-volatile storage medium based on the second physical address, determines a storage space corresponding to the second physical address, and writes the to-be-written data into the storage space corresponding to the second physical address. If the second address is a second logical address, after receiving the write instruction the storage controller 001 determines a second physical address based on the second logical address, performs addressing to the volatile storage medium or the non-volatile storage medium based on the second physical address, determines a storage space corresponding to the second physical address, and writes the to-be-written date into the storage space corresponding to the second physical address. Optionally, the storage controller 001 may send a response message to the SoC, where the response message is used to indicate that a write operation has been completed.

Figure 4:
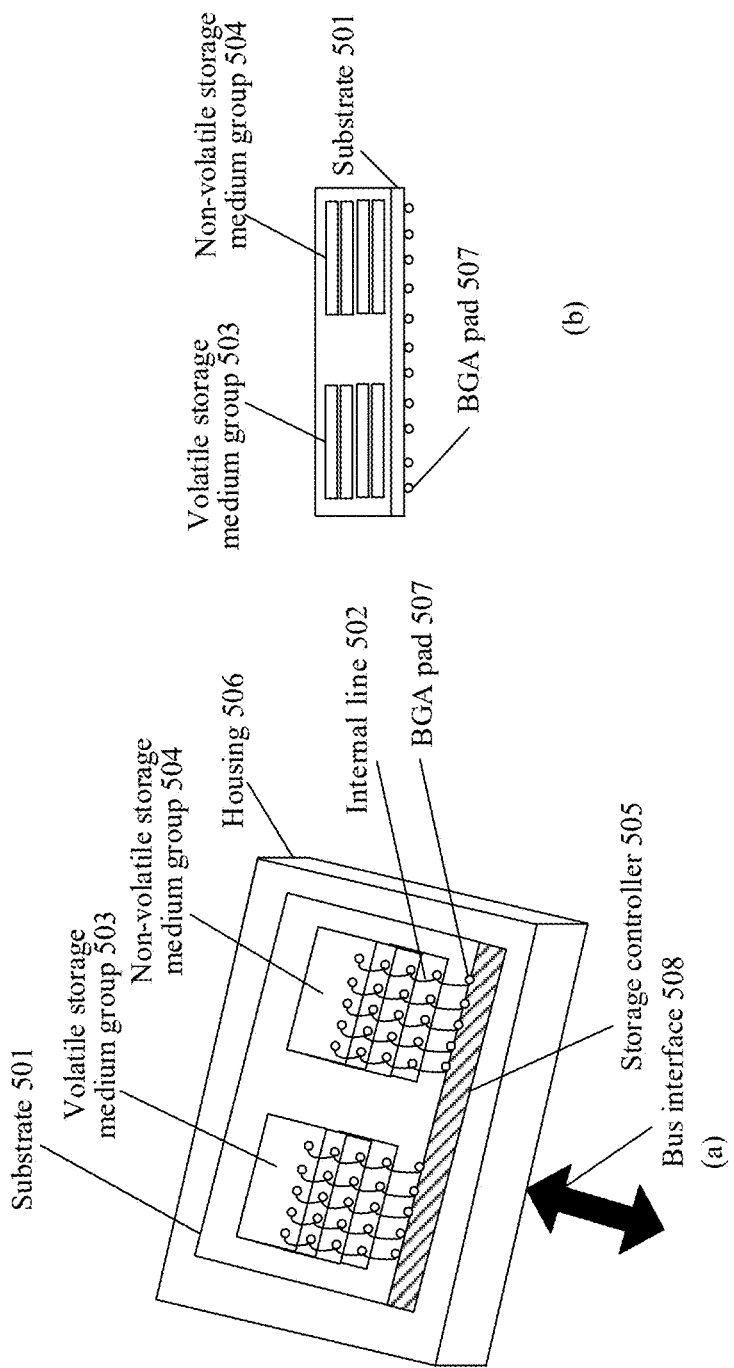
FIG. 4 is a cross-sectional view and a three-dimensional structural view of a hybrid memory according to an embodiment of this application.

(a) of FIG. 4 is a cross-sectional view of the hybrid memory. (b) of FIG. 4 is a three-dimensional structural diagram of the hybrid memory. In (a) of FIG. 4, a substrate 501, an internal line 502, a volatile storage medium group 503 (a plurality of volatile storage medium may be included and may be referred to as a volatile storage medium group), a non-volatile storage medium 504 (a plurality of non-volatile storage medium may be included and may be referred to as a non-volatile storage medium group), a storage controller 505, a housing 506, a BGA pad 507, and an bus interface 508 are included. In (b) of FIG. 4, a substrate 501, a volatile storage medium group 503, a non-volatile storage medium group 504, and a BGA pad 507 are included.

The volatile storage medium group 503 and the non-volatile storage medium group 504 may be mounted on the substrate 501. The volatile storage medium group 503 may be connected to the BGA pad 507 through the internal line 502. The non-volatile storage medium group 504 may be connected to the BGA pad 507 through the internal line 502. The storage controller 505 may be connected to the substrate 501 through the pad 507.

For example, the thickness of the substrate 501 may be 0.15 mm. The volatile storage medium group 503 may include four (4 pcs) MicronDDR4 chips manufactured using the 1 Alphanm process node. A storage space size of each MicronDDR4 chip may be 8 Gb (that is, 1 GB). A bonding wire (that is, the internal line 502) between the MicronDDR4 chips may be a gold wire. The non-volatile storage medium group 504 may include four (4 pcs) GlobalFoundry MRAM chips manufactured using the 28 nm process node, and a storage space size of each GlobalFoundry MRAM chip may be 1 Gb. A bonding wire (that is, the internal line 502) between the non-volatile storage medium may be a gold wire. The storage controller 505 is responsible for communicating with the host component (for example, the SoC), and is also responsible for managing the volatile storage medium group 503 and the non-volatile storage medium group 504. A storage space size of the hybrid memory may be a sum of the storage space size (32 Gb, that is, 4 GB) of the volatile storage medium group 503 and the storage space size (4 Gb, that is, 1 GB) of the non-volatile storage medium group 504. The storage controller 505 may be a custom controller developed on the basis of an application specific integrated chip (ASIC) and manufactured using the 22 nm process node. The housing 506 may be made of plastic material, on which a component model number may be marked. A pitch (pitch) of the BGA pad 507 may be 0.45 mm. The hybrid memory may alternatively include a power module, glue, a filler (filler), and the like, which are not shown in FIG. 4. After packaging of the hybrid memory is completed, a package level (Package Level) test may be conducted on an auto test equipment (ATE) machine to guarantee packaging quality.

It should be noted that when the electronic device uses the hybrid memory as a memory, the volatile storage medium group in the hybrid memory is capable of supporting high-speed data processing to implement high read/write performance. The non-volatile storage medium group in the hybrid memory has higher performance and lower power consumption at a relatively low frequency. Therefore, use of the hybrid memory can improve the read/write performance of electronic devices and reduce power consumption, so as to meet basic demands for low power consumption and high performance of electronic devices on the market.

In addition, a conventional memory (for example, a RAM serving as a memory) cannot be completely powered off in a screen-off state; otherwise, data in the memory is lost. In contrast, data in the non-volatile storage medium group of the hybrid memory provided in this embodiment of this application is not lost, and useful data can be stored in the non-volatile storage medium group. In this way, power can be completely interrupted when the electronic device is in the screen-off state, thereby greatly reducing power consumption. The screen-off state may also be referred to as a screen off state, and the electronic device may not display any information in the screen-off state, or may display limited information (for example, information such as current time or date). In addition, when the conventional memory is powered off, data in the memory is lost; and upon power-on next time, a to-be-executed program needs to be imported into the memory for processing before the system can be started. However, when the hybrid memory is powered off, the data in the non-volatile storage medium group of the hybrid memory is not lost, and a to-be-executed program can be stored in the non-volatile storage medium group, so that the to-be-executed program can be resumed quickly upon power-on next time, thereby better reducing standby power consumption and improving startup performance.

The hybrid memory may use different address allocation modes. The address allocation mode may include a parallel mode, a shadow mode, a hybrid mode, and the like. The following separately describes the parallel mode, the shadow mode, and the hybrid mode.

In the parallel mode, a physical address segment corresponding to the volatile storage medium does not overlap (is different from) that of the non-volatile storage medium. When the SoC accesses the hybrid memory, addressing may be performed separately to the volatile storage medium and the non-volatile storage medium.

Figure 5:
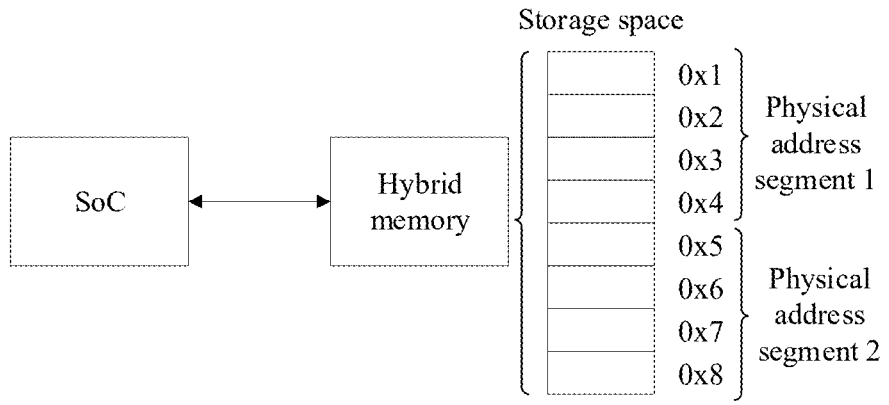
FIG. 5 is a schematic diagram of a physical address segment of a hybrid memory according to an embodiment of this application.
Figure 6:
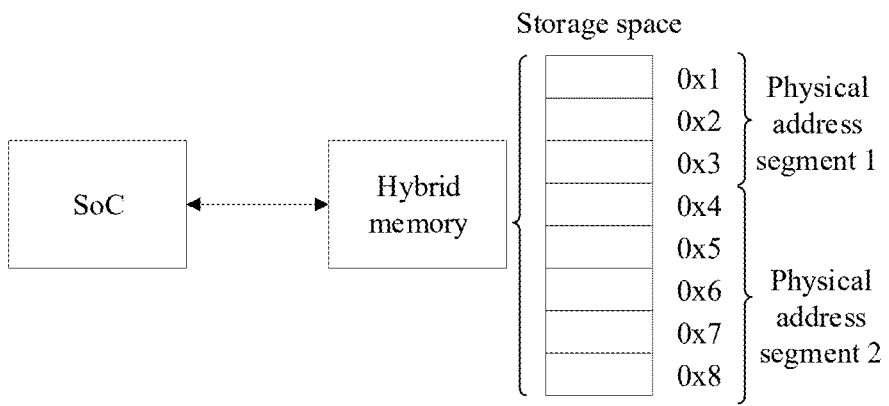
FIG. 6 is a schematic diagram of a physical address segment of another hybrid memory according to an embodiment of this application.
Figure 7:
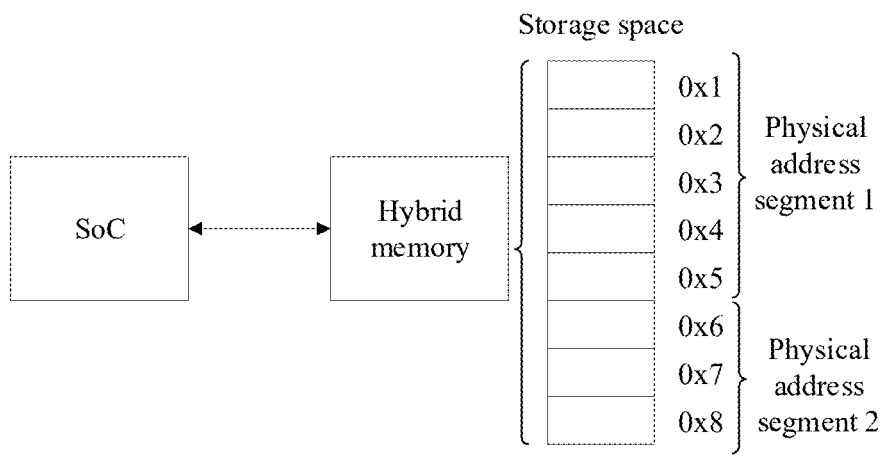
FIG. 7 is a schematic diagram of a physical address segment of another hybrid memory according to an embodiment of this application.

In the parallel mode, the storage space size of the volatile storage medium may be equal to or unequal to that of the non-volatile storage medium. For example, the number of physical addresses corresponding to the volatile storage medium may be equal to the number of physical addresses corresponding to the non-volatile storage medium. As shown in FIG. 5, the volatile storage medium and the non-volatile storage medium may correspond to a physical address segment 1 and a physical address segment 2, respectively. The physical address segment 1 includes 0x1-0x4; and the physical address segment 2 includes 0x5-0x8. Alternatively, the number of physical addresses corresponding to the volatile storage medium may be greater than the number of physical addresses corresponding to the non-volatile storage medium. As shown in FIG. 7, the volatile storage medium and the non-volatile storage medium may correspond to a physical address segment 1 and a physical address segment 2, respectively. The physical address segment 1 includes 0x1-0x5; and the physical address segment 2 includes 0x6-0x8. This is not limited in this application. Alternatively, the number of physical addresses corresponding to the volatile storage medium may be less than the number of physical addresses corresponding to the non-volatile storage medium. As shown in FIG. 6, the volatile storage medium and the non-volatile storage medium may correspond to a physical address segment 1 and a physical address segment 2, respectively. The physical address segment 1 includes 0x1-0x3; and the physical address segment 2 includes 0x4-0x8.

In the parallel mode, when the hybrid memory is powered on again after power-off, the data in the non-volatile storage medium is not lost. For data of some preset types, the data of the preset type may include, for example, instant training artificial intelligence (AI) data, patterns (pattern), training results, and the like. The data of the preset type may be written into the non-volatile storage medium (for example, FastNVM) of the hybrid memory. Such data is stored in FastNVM and can be accessed at any time. Even if the system is powered off, the data is not lost, without requiring repeated calculation. In contrast, in the prior art, it is necessary to recalculate data of a preset type after power-on, leading to power consumption, or to read data of a preset type from a low-speed storage, leading to low efficiency.

However, in this embodiment of this application, a SoC can directly read the data of the preset type from the hybrid memory serving as a memory, requiring much less time than recalculation and much less time than reading from a low-speed storage.

The hybrid memory in the parallel mode features simple hardware implementation, simple internal design, easier implementation, and lower costs.

Figure 8:
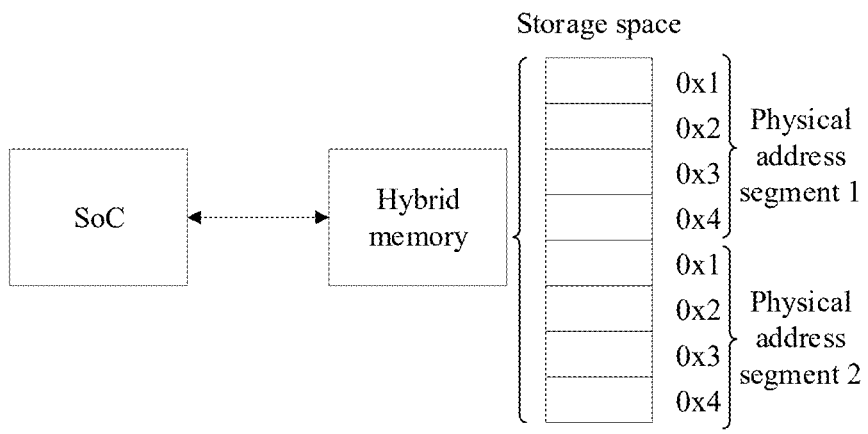
FIG. 8 is a schematic diagram of a physical address segment of another hybrid memory according to an embodiment of this application.

In the shadow mode, the physical address segment of volatile storage medium is the same as (overlaps) that of the non-volatile storage medium. That is, one physical address may point to both the volatile storage medium and the non-volatile storage medium. In the shadow mode, the volatile storage medium and the non-volatile storage medium have an equal size. That is, the number of physical addresses corresponding to the volatile storage medium is equal to the number of physical addresses corresponding to the non-volatile storage medium. For example, as shown in FIG. 8, the volatile storage medium and the non-volatile storage medium may correspond to a physical address segment 1 and a physical address segment 2, respectively. The physical address segment 1 includes 0x1-0x4; and the physical address segment 2 also includes 0x1-0x4.

When the address allocation mode is the shadow mode, the hybrid memory can implement a plurality of data storage modes by using the storage controller, including a power/performance auto balance (power/performance auto balance) mode and a data shadow (data shadow) mode. As shown in Table 1, the power/performance auto-balance mode and the data shadow mode may be configured by using a mode register (MR).

TABLE 1

| Mode register | Data storage mode | Default after power-on |
|---|---|---|
| 1 | Power/performance auto-balance mode | √ |
| 0 | Data shadow mode | |

After power-on initialization, the hybrid memory may enter a specific mode by default. For example, it may be defined that the hybrid memory enters the data shadow mode by default after being powered on, or enters the power/performance auto-balance mode by default. In table 1, the hybrid memory enters the power/performance auto-balance mode by default after being powered on.

In the power/performance auto-balance mode, when the SoC is at a high main frequency (that is, a clock frequency (CPU Clock Speed) of the CPU is greater than the maximum read/write frequency of the non-volatile storage medium), data is written into the volatile storage medium to meet fast action requirements because the maximum read/write frequency of the non-volatile storage medium is less than the main frequency (that is, a data processing speed of the non-volatile storage medium is less than a data processing speed of the processor). When the main frequency of the SoC is reduced, the maximum read/write frequency of the non-volatile storage medium is greater than or equal to the main frequency, that is, the data processing speed of the non-volatile storage medium can reach the data processing speed of the SoC and then the data can be written into the non-volatile storage medium, implementing lower power consumption. In this case, the volatile storage medium may enter an extremely low power-consuming state, to reduce power consumption. The foregoing process may be completed by the storage controller of the hybrid memory, with no need to write data into two different types of storage subunits by the SoC, thereby reducing load on the SoC side and improving processing performance of the SoC.

In the data shadow mode, when the SoC is at a high frequency, the data is first written to the volatile storage medium, and then the storage controller automatically transfers the data to the non-volatile storage medium having a lower speed; and when the system runs at a low speed range matching that of the non-volatile storage medium, the data is first written to the non-volatile storage medium, and then the storage controller automatically transfers the data to the volatile storage medium. The foregoing process may be completed by the storage controller of the hybrid memory, without requiring processing by the SoC, thereby reducing load on the SoC side and improving processing performance of the SoC.

In the data shadow mode, when the hybrid memory is powered on again after power-off, data in the volatile storage medium of the hybrid memory is lost while data in the non-volatile storage medium is still retained. Because the data in the volatile storage medium is the same as the data in the non-volatile storage medium, the data is not really lost, thereby effectively avoiding data loss.

In the hybrid mode, some physical address segments of the hybrid memory may point to both the volatile storage medium and the non-volatile storage medium; and some other physical address segments point to only the volatile storage medium or the non-volatile storage medium. As shown in Table 2, there are a plurality of combination modes between physical addresses corresponding to the volatile storage medium and physical addresses corresponding to the non-volatile storage medium. For example, the combination modes may include a combination 1, a combination 2, and a combination 3.

TABLE 2

| Combination | Address of the non-volatile storage medium | Address of the volatile storage medium | Address for independent addressing | Overlapping address |
|---|---|---|---|---|
| 1 | Any | Any | Both the non-volatile storage medium and the volatile storage medium having some independent addresses | Some addresses completely overlapping between the non-volatile storage medium and the volatile storage medium |
| 2 | Small | Large | Only the volatile storage medium having some independent addresses | Some addresses completely overlapping between the non-volatile storage medium and the volatile storage medium |
| 3 | Large | Small | Only the non-volatile storage medium having some independent addresses | Some addresses completely overlapping between the non-volatile storage medium and the volatile storage medium |

It should be noted that an independent address can be accessed through direct addressing. An overlapping address needs to be accessed through configuration of the mode register. That is, how the overlapping address is accessed needs to be determined by the storage controller, for example, being accessed in the power/performance auto-balance mode and the data shadow mode. This can not only guarantee a data processing speed, but also avoid data loss.

The overlapping address can be flexibly configured based on an amount of important data (for example, "user portrait" training data, key context information (context), or AI instant training data) that the electronic device needs to process. If the electronic device needs to process a large amount of important data, a relatively large quantity of overlapping addresses can be configured to guarantee a processing speed of the important data and avoid loss of the important data. If the electronic device needs to process a relatively small amount of important data, a relatively small quantity of overlapping addresses can be configured to avoid wasting storage space.

For example, as shown in Table 3, when the combination mode is the combination 1, both the volatile storage medium and the nonvolatile storage medium have some independent addresses and have some overlapping addresses. The number of independent addresses included in the volatile storage medium and the number of individual addresses included in the non-volatile storage medium may be the same or different, which is not limited in this application.

TABLE 3

| Combination 1 | |
| --- | --- |
| Volatile storage medium | Non-volatile storage medium |
| Independent address | Invalid |
| Independent address | Invalid |
| ... | ... |
| Independent address | Invalid |
| Overlapping address | Overlapping address |
| Overlapping address | Overlapping address |
| Invalid | Independent address |
| ... | ... |
| Invalid | Independent address |

Figure 9:
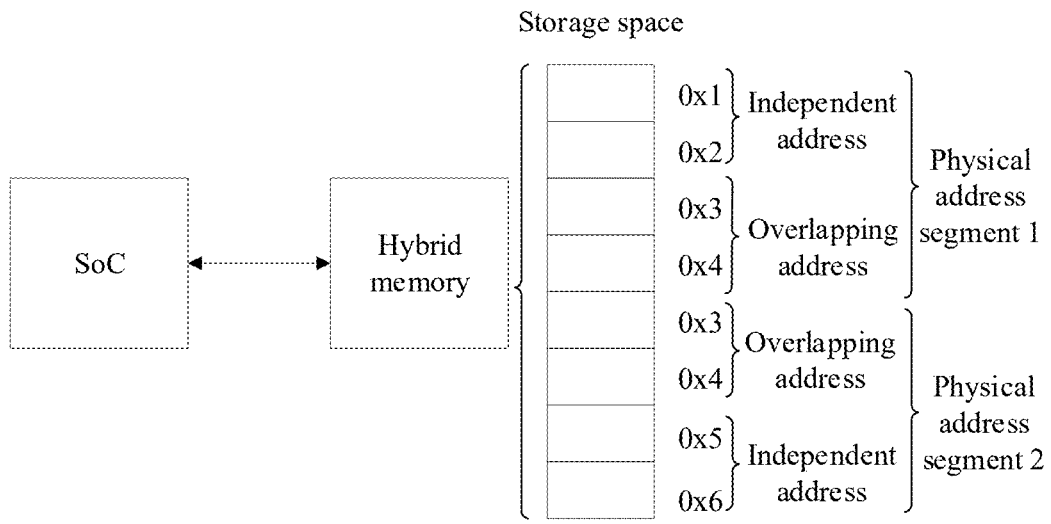
FIG. 9 is a schematic diagram of a physical address segment of a hybrid memory according to an embodiment of this application.

For example, as shown in FIG. 9, the volatile storage medium and the non-volatile storage medium may correspond to a physical address segment 1 and a physical address segment 2, respectively. The physical address segment 1 includes 0x1-0x4. The physical address segment 1 includes independent addresses and overlapping addresses, with the independent addresses including 0x1-0x2 and the overlapping addresses including 0x3-0x4. The physical address segment 2 includes 0x3-0x6. The physical address segment 2 includes independent addresses and overlapping addresses, with the independent addresses including 0x5-0x6 and the overlapping addresses including 0x3-0x4. Certainly, the number of independent addresses included in the physical address segment 1 and the number of independent addresses included in the physical address segment 2 may be different, which is not limited in this application.

The combination 1 is applicable to complex multi-core electronic devices such as mobile phones and tablets. The CPU of the electronic device at a high main frequency can perform reading/writing in a storage space (for example, 4 GB to 8 GB) indicated by the independent address of the volatile storage medium, so as to meet requirements of fast data processing. Important data (for example, "user portrait" training data, key context information (context), or AI real-time training data) can be stored in a storage space (for example, 128 MB) indicated by the overlapping address, so as to achieve effects of no loss upon power-off, no repeated training, and quick recovery. Boot code of a boot stage can be stored in a storage space (for example, 128 MB) indicated by the independent address of the non-volatile storage medium, to implement fast startup.

For another example, as shown in Table 4, when the combination mode is the combination 2, only the volatile storage medium has some independent addresses, and the nonvolatile storage medium and the volatile storage medium have some completely overlapping addresses.

TABLE 4

| Combination 2 | |
| --- | --- |
| Volatile storage medium | Non-volatile storage medium |
| Independent address | Invalid |
| Independent address | Invalid |
| ... | ... |
| Independent address | Invalid |
| Overlapping address | Overlapping address |
| Overlapping address | Overlapping address |
| Independent address | Invalid |
| Independent address | Invalid |
| Independent address | Invalid |

Figure 10:
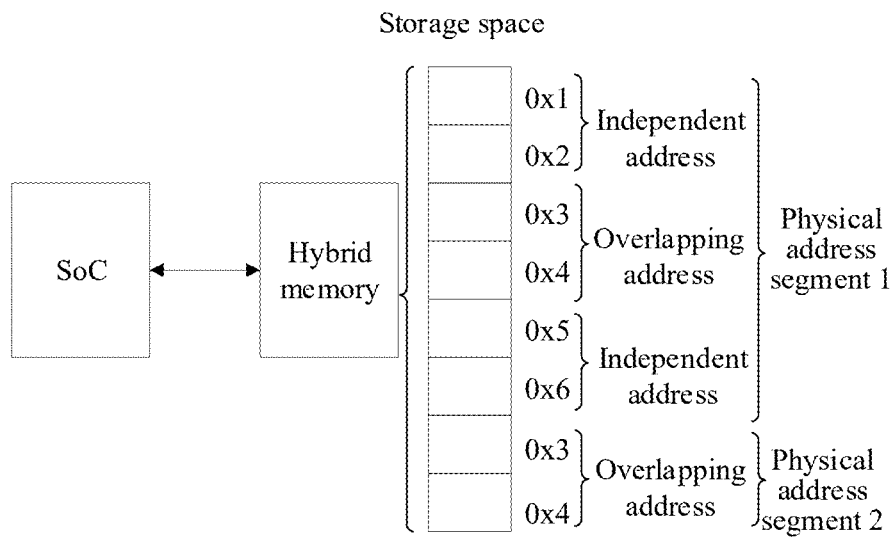
FIG. 10 is a schematic diagram of a physical address segment of a hybrid memory according to an embodiment of this application.

For example, as shown in FIG. 10, the volatile storage medium and the non-volatile storage medium may correspond to a physical address segment 1 and a physical address segment 2, respectively. The physical address segment 1 includes 0x1-0x6. The physical address segment 1 includes independent addresses and overlapping addresses, with the independent addresses including 0x1-0x2 and 0x5-0x6 and the overlapping addresses including 0x3-0x4. The physical address segment 2 includes 0x3-0x4. The physical address segment 2 includes only overlapping addresses, namely, 0x3-0x4.

The combination 2 is also applicable to complex multi-core electronic devices such as mobile phones and tablets. When the hybrid memory uses the combination 2, manufacturing costs are lower than those of the combination 1. Because the non-volatile storage medium has no independent address, the boot code at the boot stage needs to be stored in a storage space indicated by the overlapping address, so that when the electronic device is started at the boot stage, the volatile storage medium needs to be in a ready state, which increases current consumption of the volatile storage medium. However, slight power consumption is additionally increased in this case as compared to the electronic device always being in an operating state for most time in daily use, thereby benefiting more from reduced chip costs.

For another example, as shown in Table 5, when the combination mode is the combination 3, only the non-volatile storage medium has some independent addresses, and the nonvolatile storage medium and the volatile storage medium have some completely overlapping addresses.

TABLE 5

| Combination 3 | |
| --- | --- |
| Volatile storage medium | Non-volatile storage medium |
| Invalid | Independent address |
| Invalid | Independent address |
| ... | ... |
| Invalid | Independent address |
| Overlapping address | Overlapping address |
| Overlapping address | Overlapping address |

TABLE 5-continued

Combination 3

| Volatile storage medium | Non-volatile storage medium |
|---|---|
| Invalid | Independent address |
| ... | ... |
| Invalid | Independent address |

Figure 11:
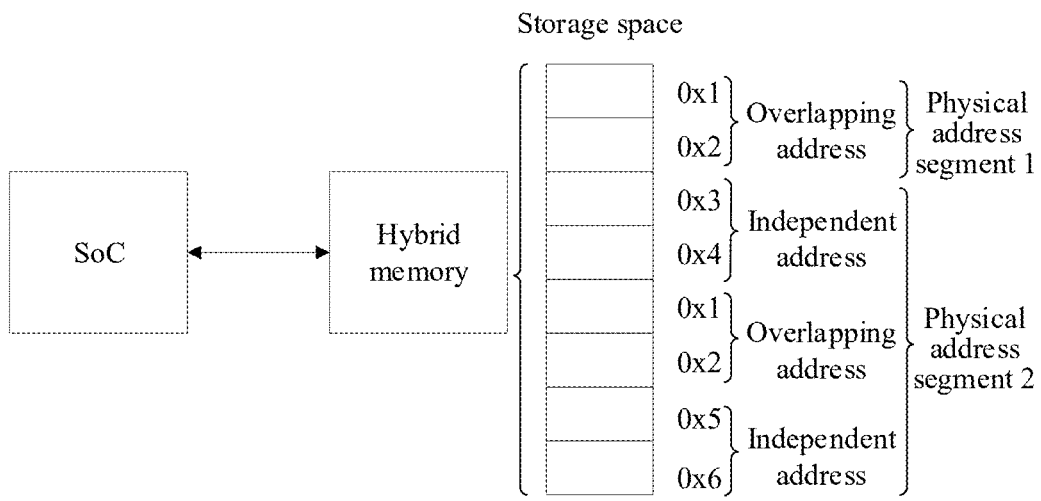
FIG. 11 is a schematic diagram of a physical address segment of a hybrid memory according to an embodiment of this application.

For example, as shown in FIG. 11, the volatile storage medium and the non-volatile storage medium may correspond to a physical address segment 1 and a physical address segment 2, respectively. The physical address segment 1 includes 0x1-0x2. The physical address segment 1 includes only overlapping addresses, that is, 0x1-0x2. The physical address segment 2 includes independent addresses and overlapping addresses, with the independent addresses including 0x3-0x4 and 0x5-0x6 and the overlapping addresses including 0x1-0x2.

The combination 3 is applicable to wearable devices, internet of things devices, and the like. A processor of the wearable device or the internet of things device usually has a main frequency lower than the maximum read/write frequency of the non-volatile storage medium, so that most data can be stored in the storage space (for example, 256 MB) indicated by the independent address of the non-volatile storage medium, for read/write processing. Data that requires high-speed processing (for example, instant training data such as speech recognition) can be processed in the storage space (for example, 128 MB) indicated by the overlapping address, that is, can be processed in the storage space of the volatile storage medium, so as to achieve effects of no loss upon power-off, no repeated training, and quick recovery. Computing results obtained through processing can be stored in the non-volatile memory to avoid loss.

In the hybrid mode, when the hybrid memory is powered on again upon power-off, the data for the physical address segment of the non-volatile storage medium is still retained. If an independent volatile memory address segment is present, data prior to power-on is lost.

The hybrid mode allows the volatile storage medium and the non-volatile storage medium to use physical addresses based on actual requirements, which is more flexible and convenient.

In addition, the SoC may use the hybrid memory in the parallel mode as that in the shadow mode or the hybrid mode by means of software based on actual requirements, which is not limited in this application.

An embodiment of this application further provides an electronic device. The electronic device may be provided with the hybrid memory described above, and the electronic device may be a device such as a mobile phone, a tablet computer, a desktop computer, a laptop computer, an ultra-mobile personal computer (UMPC), a handheld computer, a netbook, or a personal digital assistant (PDA).

Figure 12:
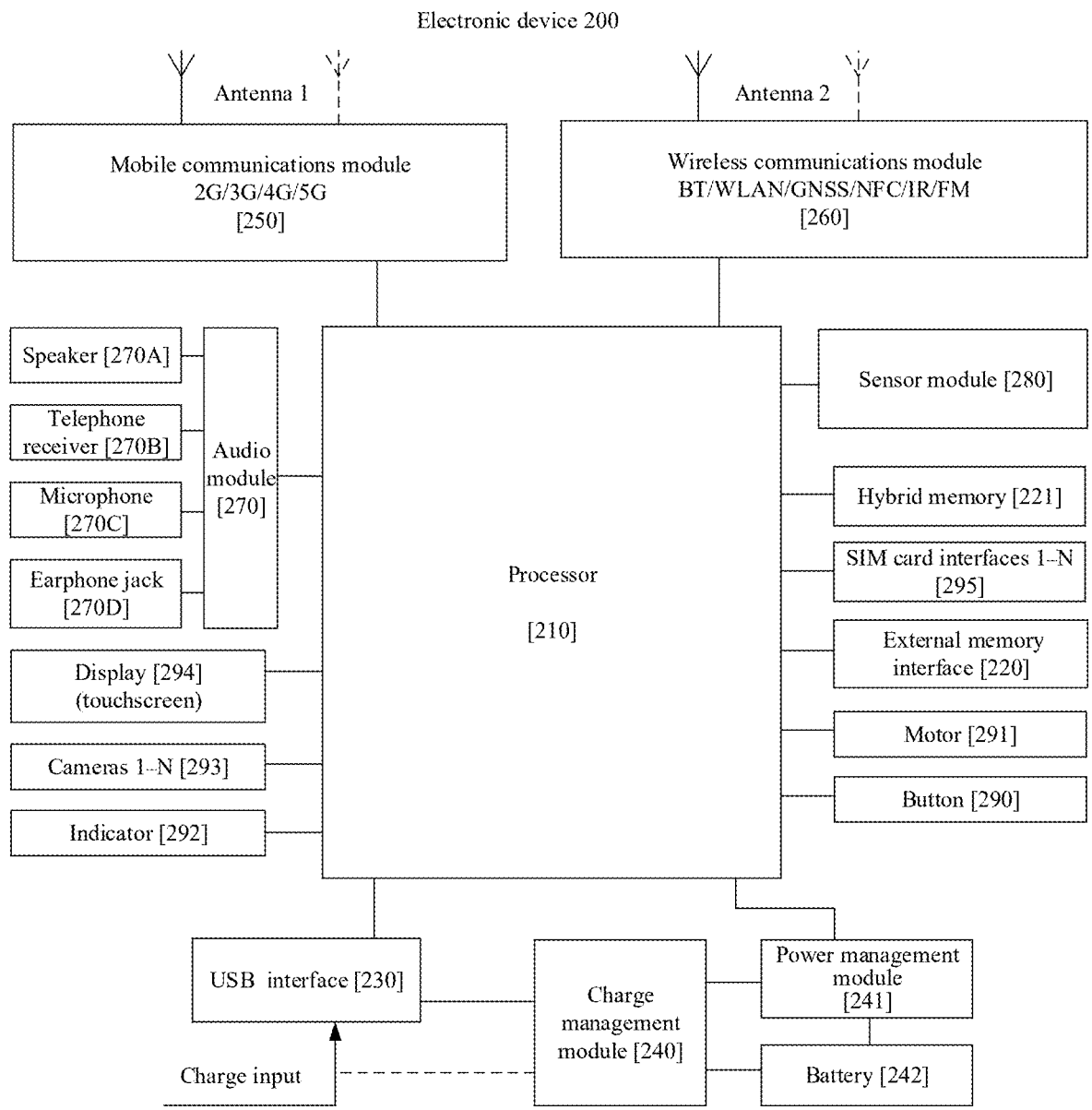
FIG. 12 is a schematic structural diagram of an electronic device according to an embodiment of this application.

For example, as shown in FIG. 12, a structure of the electronic device (for example, a mobile phone) provided in this embodiment of this application is described using an example. The electronic device 200 may include a processor 210, an external memory interface 220, a hybrid memory 221, a universal serial bus (USB) interface 230, a charge management module 240, a power management module 241, a battery 242, an antenna 1, an antenna 2, a mobile communications module 250, a wireless communications module 260, an audio module 270, a speaker 270A, a telephone receiver 270B, a microphone 270C, an earphone jack 270D, a sensor module 280, a key 290, a motor 291, an indicator 292, a camera 293, a display 294, a subscriber identity module (SIM) card interface 295, and the like.

The sensor module 280 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It can be understood that a structure illustrated in this embodiment does not constitute any specific limitation on the electronic device 200. In other embodiments, the electronic device 200 may include more or fewer components than shown in the figure, or combine some of the components, or split some of the components, or arrange the components differently. The components shown in the figure may be implemented in hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components or integrated in one or more processors.

The controller may be a nerve center and a command center of the electronic device 200. The controller may generate an operation control signal according to an instruction operation code and a timing signal to complete control of instruction fetching and execution.

A memory may be further provided in the processor 210 for storing instructions and data. In some embodiments, the memory in the processor 210 is a cache. The cache may store instructions or data recently used or repeatedly used by the processor 210. If the processor 210 needs to use the instructions or data again, the processor 210 may directly invoke the instructions or data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (mobile industry processor interface, MIPI), a general-purpose input/output (GPIO) interface, a subscriber identity module (SIM) interface, a universal serial bus (USB) interface, and/or the like.

It can be understood that an interface connection relationship between the modules illustrated in this embodiment is only a schematic illustration and does not constitute a limitation on the structure of the electronic device 200. In other embodiments, the electronic device 200 may also use different interface connection manners in the foregoing embodiments.

The charge management module 240 is configured to receive charge input from a charger. The charger may be a wireless charger, or may be a wired charger. When the charge management module 240 is charging the battery 242, power may be further supplied to the electronic device by using the power management module 241.

The power management module 241 is configured to connect the battery 242, the charge management module 240, and the processor 210. The power management module 241 receives input from the battery 242 and/or the charge management module 240, and supplies power to the processor 210, the hybrid memory 221, the external storage, the display 294, the camera 293, the wireless communications module 260, and the like. In some embodiments, the power management module 241 and the charge management module 240 may alternatively be disposed in a same component.

A wireless communication function of the electronic device 200 may be implemented by using the antenna 1, the antenna 2, the mobile communications module 250, the wireless communications module 260, the modem processor, the baseband processor, and the like. In some embodiments, in the electronic device 200, the antenna 1 is coupled to the mobile communications module 250, and the antenna 2 is coupled to the wireless communications module 260, so that the electronic device 200 can communicate with a network and other devices by using a wireless communication technology.

The antenna 1 and the antenna 2 are configured to transmit and receive electromagnetic wave signals. Each antenna in the electronic device 200 may be configured to cover one or more communication bands. In addition, different antennas may support multiplexing so as to increase antenna utilization. For example, may be used also as a diversity antenna of a wireless local area network. In some other embodiments, the antenna may be used in combination with a tuning switch.

The mobile communications module 250 may provide wireless communication solutions including 2G, 3G, 4G, 5G, and the like which are applied to the electronic device 200. The mobile communications module 250 may include at least one filter, a switch, a power amplifier, a low noise amplifier (LNA), and the like. The mobile communications module 250 may receive an electromagnetic wave by using the antenna 1, perform processing such as filtering and amplification on the received electromagnetic wave, and transmit the processed electromagnetic wave to a modem processor for demodulation.

The mobile communications module 250 may further amplify a signal modulated by the modem processor, and convert the signal into an electromagnetic wave and radiate the electromagnetic wave by using the antenna 1. In some embodiments, at least some functional modules of the mobile communications module 250 may be provided in the processor 210. In some embodiments, at least some functional modules of the mobile communications module 250 may be provided in a same component as at least some modules of the processor 210.

The wireless communications module 260 may provide wireless communication solutions applied to the electronic device 200, including WLAN (for example, wireless fidelity (Wi-Fi) network), Bluetooth (BT), global navigation satellite system (GNSS), frequency modulation (FM), near field communication (NFC), infrared (IR), and the like.

The wireless communications module 260 may be one or more components integrating at least one communication processing module. The wireless communications module 260 receives an electromagnetic wave by using the antenna 2, performs frequency modulation and filtering processing on an electromagnetic wave signal, and sends a processed signal to the processor 210. The wireless communications module 260 may also receive a to-be-sent signal from the processor 210, perform frequency modulation and amplification on the signal, and convert the signal into an electromagnetic wave and radiate the electromagnetic wave by using the antenna 2.

The electronic device 200 implements a display function by using the GPU, the display 294, the application processor, and the like. The GPU is a microprocessor for image processing, and is connected to the display 294 and the application processor. The GPU is configured to perform mathematical and geometric computing for graphics rendering. The processor 210 may include one or more GPUs that execute program instructions to generate or change display information.

The display 294 is configured to display images, videos, and the like. The display 294 includes a display panel.

The electronic device 200 may implement a photographing function by using the ISP, the camera 293, the video codec, the GPU, the display 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be configured to connect an external memory card, for example, a micro SD card, to extend a storage capacity of the electronic device 200. The external memory card communicates with the processor 210 through the external memory interface 220 to implement a data storage function. For example, files such as music and videos are stored in the external memory card.

The hybrid memory 221 may be configured to store computer executable program code, where the executable program code includes instructions. The processor 210 executes various functional applications of the electronic device 200 and data processing by executing the instructions stored in the hybrid memory 221. For example, in this embodiment of this application, the processor 210 may execute the instructions stored in the hybrid memory 221. The hybrid memory 221 may include a program storage area and a data storage area.

The program storage area may store an operating system, an application program required by at least one function (for example, a sound play function or an image play function), and the like. The data storage area may store data (for example, audio data or a phone book) and the like that are created during use of the electronic device 200. In addition, the hybrid memory 221 may include a high-speed random access memory, and may further include a nonvolatile memory, for example, at least one magnetic disk storage device, flash memory device, or universal flash storage (UFS).

The electronic device 200 may implement an audio function, for example, music playing or recording, by using the audio module 270, the speaker 270A, the telephone receiver 270B, the microphone 270C, the earphone jack 270D, the application processor, and the like.

The button 290 includes a power button, a volume button, and the like. The button 290 may be a mechanical button, or may be a touch button. The motor 291 may generate vibrating alerts. The motor 291 may be used to vibrate to provide alerts for incoming calls, or may be used to vibrate to provide touch feedback. The indicator 292 may be an indicator light, and may be used to indicate a charging status and power change, or may be used to indicate messages, missed calls, notifications, and the like. The SIM card interface 295 is configured to connect a SIM card. The SIM card may be inserted into the SIM card interface 295 or pulled out from the SIM card interface 295 to achieve contact with or separation from the electronic device 200. The electronic device 200 may support one or N SIM card interfaces, where N is a positive integer greater than 1. The SIM card interface 295 may support a nano SIM card, a micro SIM card, a SIM card, and the like.

It can be understood that the mobile phone 100 may have more or fewer components than shown in FIG. 12, may combine two or more components, or may have different component configurations. The components shown in FIG. 12 may be implemented in hardware that includes one or more signal processing or application-specific integrated circuits, in software, or in a combination of hardware and software.

An embodiment of this application further provides a computer storage medium. The computer storage medium stores computer instructions. When the computer instructions run on an electronic device, the electronic device is enabled to perform the foregoing related steps to implement the method in the foregoing embodiments.

An embodiment of this application further provides a computer program product. When the computer program product runs on a computer, the computer is enabled to perform the foregoing related steps to implement the method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the method in the foregoing method embodiments.

The electronic device, computer storage medium, computer program product, and chip provided in the embodiments are all configured to perform the corresponding method provided above. Therefore, for beneficial effects that can be achieved by the electronic device, computer storage medium, computer program product, and chip, refer to the beneficial effects of the corresponding method provided above. Details are not described herein again.

From the descriptions of the foregoing implementations, a person skilled in the art may realize that, for ease and brevity of description, only division into the foregoing function modules is used as an example for description; and in actual application, the foregoing functions may be allocated to different function modules for implementation as required. That is, an internal structure of the apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely a logical function division, and another division manner may be used during actual implementation. For example, a plurality of units or components may be combined, or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate components may or may not be physically separate. A component displayed as a unit may be one or more physical units, and may be located in one place, or may be distributed in a plurality of places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

If the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a read-only memory (ROM), a RAM, a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hybrid memory, wherein
the hybrid memory comprises a storage controller, a volatile storage medium, and a non-volatile storage medium;
the storage controller receives a read/write instruction from a processor, wherein the read/write instruction carries a first address and the storage controller is configured to:
write data into the volatile storage medium or read data from the volatile storage medium in response to the first address corresponding to both the non-volatile storage medium and the volatile storage medium and a main frequency of the processor being greater than a maximum read/write frequency of the non-volatile storage medium; and
write data into the non-volatile storage medium or read data from the non-volatile storage medium in response to the first address corresponding to both the non-volatile storage medium and the volatile storage medium and the main frequency of the processor is less than or equal to the maximum read/write frequency of the non-volatile storage medium.

2. The hybrid memory according to claim 1, wherein
if the main frequency of the processor is greater than the maximum read/write frequency of the non-volatile storage medium, the storage controller is further configured to write, into the non-volatile storage medium, data that has been written into the volatile storage medium; and
if the main frequency of the processor is less than or equal to the maximum read/write frequency of the non-volatile storage medium, the storage controller is further configured to write, into the volatile storage medium, data that has been written into the non-volatile storage medium.

3. The hybrid memory according to claim 1, wherein the hybrid memory further comprises at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing externally presents the bus interface, and the bus interface is configured to connect the processor.

4. The hybrid memory according to claim 1, wherein the volatile storage medium comprises at least one of a double data rate DDR memory, a DDR2, a DDR3, a DDR4, a high bandwidth memory HBM, a dynamic random access memory DRAM, or a 3D super DRAM; and the non-volatile storage medium comprises at least one of a single level cell flash memory SLC-NAND, a magnetic random access memory MRAM, a resistive random access memory RRAM, a phase change random access memory PCRAM, a 3D-Xpoint storage medium, or a 3D-SLC NAND flash memory.

5. The hybrid memory according to claim 1, wherein the hybrid memory is installed in an electronic device as a memory.

6. The hybrid memory according to claim 5, wherein the hybrid memory is powered off when the electronic device is screen-off.

7. The hybrid memory according to claim 1, wherein the non-volatile storage medium is configured to store data of a preset type, and the data of the preset type comprises at least one of artificial intelligence AI data, patterns, and training results, for instant training.

8. The hybrid memory according to claim 1, wherein the first address is a physical address or a logical address; and when the first address is a logical address, the storage controller is further configured to translate the logical address to a physical address.

9. The hybrid memory according to claim 1, wherein the storage controller is further configured to:

write data into the data into the volatile storage medium or read data from the volatile storage medium in response to the first address corresponding to only the volatile storage medium; and write data into the non-volatile storage medium or read data from the non-volatile storage medium in response to the first address corresponding to only the non-volatile storage medium.

10. A data read/write method, applied to a hybrid memory, wherein the hybrid memory comprises a storage controller, a volatile storage medium, and a non-volatile storage medium;

receiving, by the storage controller, a read/write instruction from a processor, wherein the read/write instruction carries a first address;

determining, by the storage controller, the first address corresponds to both the non-volatile storage medium and the volatile storage medium;

determining, by the storage controller, a main frequency of the processor is less than or equal to a maximum read/write frequency of the non-volatile storage medium; and writing, by the storage controller, data into the non-volatile storage medium or reading, by the storage controller, data from the non-volatile storage medium in response to the first address corresponding to both the non-volatile storage medium and the volatile storage medium and the main frequency of the processor is less than or equal to the maximum read/write frequency of the non-volatile storage medium.

11. The method according to claim 10, wherein when the main frequency of the processor is greater than the maximum read/write frequency of the non-volatile storage medium, the method further comprises:

writing, by the storage controller, into the non-volatile storage medium, data that has been written into the volatile storage medium; and when the main frequency of the processor is less than or equal to the maximum read/write frequency of the non-volatile storage medium, the method further comprises:

writing, by the storage controller, into the volatile storage medium, data that has been written into the non-volatile storage medium.

12. The method according to claim 10, wherein the hybrid memory further comprises at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing externally presents the bus interface, and the bus interface is configured to connect the processor.

13. The method according to claim 10, wherein the volatile storage medium comprises at least one of a double data rate DDR memory, a DDR2, a DDR3, a DDR4, a high bandwidth memory HBM, a dynamic random access memory DRAM, or a 3D super DRAM; and the non-volatile storage medium comprises at least one of a single level cell flash memory SLC-NAND, a magnetic random access memory MRAM, a resistive random access memory RRAM, a phase change random access memory PCRAM, a 3D-Xpoint storage medium, or a 3D-SLC NAND flash memory.

14. The method according to claim 10, wherein the hybrid memory is installed in an electronic device as a memory.

15. The method according to claim 10, wherein the non-volatile storage medium is configured to store data of a preset type, and the data of the preset type comprises at least one of artificial intelligence AI data, patterns, and training results, for instant training.

16. The method according to claim 10, wherein the first address is a physical address or a logical address; and when the first address is a logical address, the method further comprises:

further translating, by the storage controller, the logical addresses to a physical address.

17. An electronic device, comprising a processor, a hybrid memory, and a bus, wherein the processor and the hybrid memory are connected through the bus, and the hybrid memory comprises a storage controller, a volatile storage medium, and a non-volatile storage medium; and the hybrid memory is configured to store a computer program code, the computer program code comprises computer instructions, and when the computer instructions are executed by the processor, the processor and the hybrid memory are enabled to perform a method, the method comprising:

receiving, by the storage controller, a read/write instruction from the processor, wherein the read/write instruction carries a first address and the storage controller is configured to:

write data into the volatile storage medium or read data from the volatile storage medium in response to the first address corresponding to both the non-volatile storage medium and the volatile storage medium and a main frequency of the processor being greater than a maximum read/write frequency of the non-volatile storage medium; and write data into the non-volatile storage medium or read data from the non-volatile storage medium in response to the first address corresponding to both the non-volatile storage medium and the volatile storage medium and the main frequency of the processor is less than or equal to a maximum read/write frequency of the non-volatile storage medium.

18. The electronic device according to claim 17, wherein when the main frequency of the processor is greater than the maximum read/write frequency of the non-volatile storage medium, the method further comprises:

writing, by the storage controller, into the non-volatile storage medium, data that has been written into the volatile storage medium; and when the main frequency of the processor is less than or equal to the maximum read/write frequency of the non-volatile storage medium, the method further comprises:

writing, by the storage controller, into the volatile storage medium, data that has been written into the non-volatile storage medium.

19. The electronic device according to claim 17, wherein the hybrid memory further comprises at least one of a bus, a substrate, a packaging housing, and a bus interface; and the storage controller, the volatile storage medium, and the non-volatile storage medium are integrated on the substrate, the volatile storage medium is connected to the non-volatile storage medium through the bus, the storage controller, the volatile storage medium, the non-volatile storage medium, the bus, and the substrate are packaged inside the packaging housing, the packaging housing externally presents the bus interface, and the bus interface is configured to connect the processor.

20. The electronic device according to claim 17, wherein the storage controller is further configured to:

write data into the data into the volatile storage medium or read data from the volatile storage medium in response to the first address corresponding to only the volatile storage medium; and write data into the non-volatile storage medium or read data from the non-volatile storage medium in response to the first address corresponding to only the non-volatile storage medium.

* * * * *